United States Patent
Prasad et al.

(10) Patent No.: US 10,932,131 B2
(45) Date of Patent: Feb. 23, 2021

(54) SERVICE PROVISIONING BY LOCAL OPERATOR

(71) Applicant: NOKIA SOLUTIONS AND NETWORKS OY, Espoo (FI)

(72) Inventors: Athul Prasad, Helsinki (FI); Mikko Aleksi Uusitalo, Helsinki (FI); Zexian Li, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/322,994

(22) PCT Filed: Aug. 3, 2016

(86) PCT No.: PCT/EP2016/068565
§ 371 (c)(1),
(2) Date: Feb. 4, 2019

(87) PCT Pub. No.: WO2018/024328
PCT Pub. Date: Feb. 8, 2018

(65) Prior Publication Data
US 2019/0191308 A1 Jun. 20, 2019

(51) Int. Cl.
*H04W 12/06* (2009.01)
*H04W 48/16* (2009.01)
(Continued)

(52) U.S. Cl.
CPC ............ *H04W 12/06* (2013.01); *H04L 63/08* (2013.01); *H04L 63/083* (2013.01);
(Continued)

(58) Field of Classification Search
CPC ..... H04W 12/06; H04W 28/10; H04W 48/08; H04W 48/16; H04W 56/00
See application file for complete search history.

(56) References Cited

U.S. PATENT DOCUMENTS 9,629,002 B2 4/2017 Lee et al.
2010/0009676 A1* 1/2010 Cormier ............... H04W 40/00
455/426.1
(Continued)

FOREIGN PATENT DOCUMENTS

KR 20110073524 A 6/2011
KR 20150115216 A 10/2015

OTHER PUBLICATIONS http://multefire.org/.
(Continued)

*Primary Examiner* — Kyaw Z Soe
(74) *Attorney, Agent, or Firm* — Squire Patton Boggs (US) LLP

(57) ABSTRACT

It is provided a method, comprising monitoring if a network information from a server part of an application is received by a client part of the application, wherein the client part is connected to the server part via a first network, the first network is of a radio access technology, the network parameter is related to a second network, and the second network is of the radio access technology, and the second network is different from the first network; and controlling a cellular radio layer such that it interworks with the second network based on the network information if the network information is received.

12 Claims, 11 Drawing Sheets

(51) Int. Cl.
　　*H04L 29/06*　　(2006.01)
　　*H04W 48/18*　　(2009.01)
　　*H04W 76/15*　　(2018.01)
　　*H04W 8/20*　　(2009.01)
　　*H04W 4/50*　　(2018.01)
　　*H04W 8/18*　　(2009.01)
　　*H04W 28/10*　　(2009.01)
　　*H04W 48/08*　　(2009.01)
　　*H04W 56/00*　　(2009.01)
　　*H04W 88/06*　　(2009.01)
　　*H04W 16/14*　　(2009.01)

(52) U.S. Cl.
　　CPC .......... *H04L 63/0876* (2013.01); *H04L 69/14* (2013.01); *H04W 4/50* (2018.02); *H04W 8/183* (2013.01); *H04W 8/205* (2013.01); *H04W 28/10* (2013.01); *H04W 48/08* (2013.01); *H04W 48/16* (2013.01); *H04W 48/18* (2013.01); *H04W 56/001* (2013.01); *H04W 76/15* (2018.02); *H04W 16/14* (2013.01); *H04W 88/06* (2013.01)

(56) References Cited

U.S. PATENT DOCUMENTS

| | | | |
|---|---|---|---|
| 2010/0067434 A1* | 3/2010 | Siu ........................ | H04W 48/18 370/328 |
| 2015/0056985 A1* | 2/2015 | Swaminathan ....... | H04W 88/06 455/432.1 |
| 2015/0171701 A1* | 6/2015 | Kim ........................ | H02K 1/22 310/216.123 |
| 2015/0288828 A1 | 10/2015 | Lim et al. | |
| 2016/0006739 A1 | 1/2016 | Huang et al. | |

OTHER PUBLICATIONS

International Search Report and Written Opinion dated Feb. 9, 2017 corresponding to International Patent Application No. PCT/EP2016/068565.

Jan. 31, 2020 Office Action issued Korean Patent Application No. 10-2019-7006134.

* cited by examiner

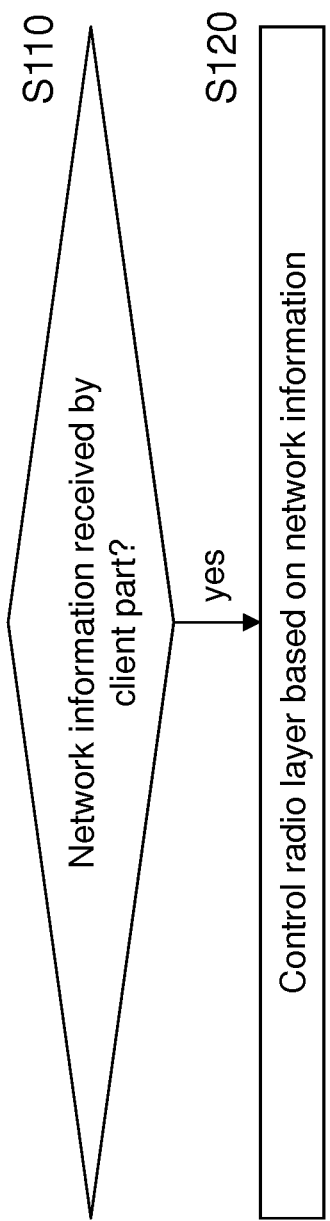
Fig. 9
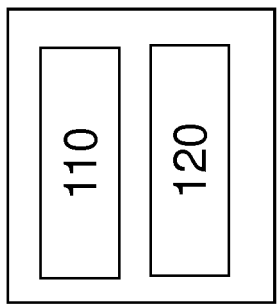
Fig. 8
Fig. 11
Fig. 10

SERVICE PROVISIONING BY LOCAL OPERATOR

FIELD OF THE INVENTION

Some embodiments of the present invention relate to an apparatus, a method, and a computer program product related to coexistence of two network operators (for e.g. local operator and incumbent operator). The network operators may be independent from each other but need not to be independent from each other. More particularly, the present invention relates to an apparatus, a method, and a computer program product related to service provisioning by the local operator in the presence of the incumbent operator.

ABBREVIATIONS

3GPP 3$^{rd}$ Generation Partnership Project
5G 5$^{th}$ Generation
5GNB NodeB of 5$^{th}$ Generation
App Application
CN Core Network
EPC Evolved Packet Core
GPS Global Positioning System
ID Identification
Incumbent Operator
IoT Internet of Things
LO Local Operator
LTE Long Term Evolution
LTE-A LTE Advanced
MC Multi-Connectivity
NW Network
OS Operating System
P-GW Packet Data Network Gateway
PLMN Public Land Mobile Network
QCI QoS Class Identifier
QoS Quality of Service
RAP Radio Access Point
RAT Radio Access Technology
SIB System Information Block
SIM Subscriber Identity Module
TFT Traffic Flow Templates
UE User Equipment
UICC Universal Integrated Circuit Card
USIM Universal Subscriber Identity Module
WiFi Wireless Fidelity

BACKGROUND OF THE INVENTION

Local operators (LOs) are considered to be one of the key enablers for network deployments and specialized service provisioning in the fifth generation (5G) networks, mainly due to need for ultra-dense networks addressing high capacity needs. Local operators will also have increasing opportunities for their operation via spectrum sharing, like Google in US on 3.5 GHz. For example, a local operator can be an operator who leases a certain portion of a spectrum and provides certain services, typically in a limited area, while an incumbent operator (IO) provides its services over a larger area (e.g. substantially the whole or even the whole of a country). Incumbent operators (or service providers acting insofar in the name of the incumbent operator), issue SIM cards or UICC comprising a USIM application in order to identify users of their network and to allow roaming of the own users to other incumbent networks if a roaming agreement exists. An LO typically does not issue SIM cards or UICCs. The LO may deploy any RAT suitable for its spectrum while the IO deploys a 3GPP network (such as LTE, LTE-A, 5G).

While there are various modes of operation currently being studied for the local operators, there are two main most feasible approaches:
 (a) The LOs and IOs operate jointly with bilateral revenue sharing agreements;
 (b) LOs and IOs operate independently without any interactions between them.

The first approach has various advantages such as better inter-working between IO and LO with better mobility support, optimized network deployment density (when multiple IOs cooperate with a LO), etc. But this would also mean that the LOs would need to have bilateral agreements with all the IOs for deploying the network.

In this application, the second approach is considered, where the IOs and LOs are uncoordinated, with the LOs leasing the spectrum from regulatory authorities, within finite geographic area(s). This enables easy deployment and service provisioning by the LOs, without depending on cooperation/coordination from the IOs. The LO may provide specialized services such as high-performance gaming or virtual reality arenas, ultra-low latency robotics arena, network for an industrial plant, etc., where the services are provisioned using 5G-UEs. Using 5G-radio access points (5G-RAP, also named 5GNB) for providing such services provides the LOs access to a wide variety of features such as extreme mobile broadband with significantly high capacity and ultra-low latency with very high levels of reliability. There are obvious cost benefits of using widely available 5G-RAPs as compared to using proprietary base stations, with access to the 5G-UEs. By removing the mandatory requirement for having SIM cards (UICC with USIM application) for accessing the 5G-RAP, the LOs have more flexibility in having access to a wide variety of users with innovating charging functionalities.

Some related work for doing a manual PLMN scan to enable the user to select an appropriate PLMN based on the scanning of all PLMNs is discussed in [1]. In [2], a method for storing PLMN and related information in case of failures such as radio link or handover in a mobile device is disclosed. The basic assumption in existing work remains that the PLMN identity is always pre-configured in the UE or included in SIM card, which is a valid case for IO network selection scenario. But for the randomly deployed LOs considered in this application, mechanisms for PLMN selection, authentication and charging are currently not available. Another related work is ongoing in MulteFire project [3] where industry standards are being developed for unlicensed band deployments. Here the focus is mainly on providing concepts on top of 3GPP network to enable operators deploy networks in unlicensed band which can tightly interwork with the LTE network.

REFERENCES

[1] A. Swaminathan, et al. "Apparatus and method for implementing a manual PLMN scan." U.S. patent application Ser. No. 14/229,247.
[2] Lee, Youngdae, et al. "Method and device for storing PLMN information on user equipment in wireless communication system." U.S. patent application Ser. No. 14/344,027.
[3] http://multefire.org/

SUMMARY OF THE INVENTION

It is an object of the some embodiments of the invention to improve the prior art.

According to a first aspect of the invention, there is provided an apparatus, comprising at least one processor, at least one memory including computer program code, and the at least one processor, with the at least one memory and the computer program code, being arranged to cause the apparatus to perform at least monitoring if a network information from a server part of an application is received by a client part of the application, wherein the client part is connected to the server part via a first network, the first network is of a radio access technology, the network parameter is related to a second network, the second network is of the radio access technology, and the second network is different from the first network; and controlling a cellular radio layer such that it interworks with the second network based on the network information if the network information is received.

The network information may comprise a request to connect the client part to the server part via the second network; and the controlling may comprise controlling the cellular radio layer to access the second network if the network information comprises the request, wherein the at least one processor, with the at least one memory, may be further arranged to perform connecting the client part to the server part via the second network after the second network has been accessed.

The network information may comprise an access parameter of the second network; and the controlling may comprise controlling the cellular radio layer to access the second network using the access parameter.

A user of the client part may be authenticated to the application by credentials, the user may be authenticated to the first network by user information different from the credentials, and the at least one processor, with the at least one memory, may be further arranged to perform authenticating the user to the second network by the credentials.

The user may be authenticated to the second network without using the user information.

The user information may be stored on an identity module and the credentials may not be stored on the identity module.

The network information may comprise a traffic flow parameter; and the controlling may comprise steering a traffic to the first network and to the second network according to the traffic flow parameter if the cellular radio layer is served by the first network and the second network.

The network information may comprise at least one of a discovery information of the second network and a synchronization information of the second network; and the controlling may comprise controlling the cellular radio layer such that it searches the second network based on the at least one of the discovery information and the synchronization information.

According to a second aspect of the invention, there is provided an apparatus, comprising at least one processor, at least one memory including computer program code, and the at least one processor, with the at least one memory and the computer program code, being arranged to cause the apparatus to perform at least providing, by a server part of an application, a network information to a client part of the application, wherein the client part is connected to the server part via a first network, the first network is of a radio access technology, and the network information is related to a predetermined second network, the second network is of the radio access technology, and the second network is different from the first network.

The network information may comprise at least one of an access parameter of the second network and a request to connect the client part to the server part via the second network.

The network information may comprise the request, and the at least one processor, with the at least one memory, may be further arranged to perform evaluating, based on at least one of a received location information and a received measurement information, if a device on which the client part is running is close to the second network; and inhibiting the providing of the request if the device is not close to the second network.

The network information may comprise at least one of a discovery information and a synchronization information, and the at least one processor, with the at least one memory, may be further arranged to perform informing a base station of the second network to start transmitting the at least one of the discovery information and the synchronization information.

According to a third aspect of the invention, there is provided an apparatus, comprising at least one processor, at least one memory including computer program code, and the at least one processor, with the at least one memory and the computer program code, being arranged to cause the apparatus to perform at least checking if a client part of an application is connected to a server part of the application via a first network of a radio access technology; monitoring if the client part becomes connected to the server part via a predetermined second network of the radio access technology if the client part is connected to the server part via the first network, wherein the second network is different from the first network; providing, by the server part to a charging device, an information on a usage of the second network for the communication between the server part and the client part if the client part becomes connected to the server part via the second network.

According to a fourth aspect of the invention, there is provided an apparatus, comprising at least one processor, at least one memory including computer program code, and the at least one processor, with the at least one memory and the computer program code, being arranged to cause the apparatus to perform at least monitoring if a user authenticates to a radio network by credentials in order to access the radio network; checking if the user is authenticated to a predetermined application by the credentials, if the user authenticates to the radio network by the credentials; granting access to the radio network for the user if the user is authenticated to the predetermined application by the credentials.

According to a fifth aspect of the invention, there is provided a method, comprising monitoring if a network information from a server part of an application is received by a client part of the application, wherein the client part is connected to the server part via a first network, the first network is of a radio access technology, the network parameter is related to a second network, and the second network is of the radio access technology, and the second network is different from the first network; and controlling a cellular radio layer such that it interworks with the second network based on the network information if the network information is received.

The network information may comprise a request to connect the client part to the server part via the second network; and the controlling may comprise controlling the cellular radio layer to access the second network if the network information comprises the request, wherein the method further comprises: connecting the client part to the server part via the second network after the second network has been accessed.

The network information may comprise an access parameter of the second network; and the controlling may comprise controlling the cellular radio layer to access the second network using the access parameter.

A user of the client part may be authenticated to the application by credentials, the user may be authenticated to the first network by user information different from the credentials, and the method may further comprise: authenticating the user to the second network by the credentials.

The user may be authenticated to the second network without using the user information.

The user information may be stored on an identity module and the credentials may not be stored on the identity module.

The network information may comprise a traffic flow parameter; and the controlling may comprise steering a traffic to the first network and to the second network according to the traffic flow parameter if the cellular radio layer is served by the first network and the second network.

The network information may comprise at least one of a discovery information of the second network and a synchronization information of the second network; and the controlling may comprise controlling the cellular radio layer such that it searches the second network based on the at least one of the discovery information and the synchronization information.

According to a sixth aspect of the invention, there is provided a method, comprising providing, by a server part of an application, a network information to a client part of the application, wherein the client part is connected to the server part via a first network, the first network is of a radio access technology, and the network information is related to a predetermined second network, the second network is of the radio access technology, and the second network is different from the first network.

The network information may comprise at least one of an access parameter of the second network and a request to connect the client part to the server part via the second network.

The network information may comprise the request, and the method may further comprise: evaluating, based on at least one of a received location information and a received measurement information, if a device on which the client part is running is close to the second network; and inhibiting the providing of the request if the device is not close to the second network.

The network information may comprise at least one of a discovery information and a synchronization information, and the method may further comprise: informing a base station of the second network on to start transmitting the at least one of the discovery information and the synchronization information.

According to a seventh aspect of the invention, there is provided a method, comprising checking if a client part of an application is connected to a server part of the application via a first network of a radio access technology; monitoring if the client part becomes connected to the server part via a predetermined second network of the radio access technology if the client part is connected to the server part via the first network, wherein the second network is different from the first network; providing, by the server part to a charging device, an information on a usage of the second network for the communication between the server part and the client part if the client part becomes connected to the server part via the second network.

According to an eighth aspect of the invention, there is provided a method, comprising monitoring if a user authenticates to a radio network by credentials in order to access the radio network; checking if the user is authenticated to a predetermined application by the credentials, if the user authenticates to the radio network by the credentials; granting access to the radio network for the user if the user is authenticated to the predetermined application by the credentials.

Each of the methods of the fifth to eighth aspects may be a method of service provisioning.

According to a ninth aspect of the invention, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some example embodiments of the invention, at least one of the following technical effects may be provided:

LO may use 5GNB, thus achieving economy of scale;
Flexibility in network and service deployment for the LO;
Reduced administration effort for LO and IO compared to a solution coordinated between LO and IO;
Less error prone network configuration compared to a solution coordinated between LO and IO;
Standardized access to LO's network;
Higher user satisfaction for specialized services;
Network of IO is not challenged by specialized services;
Easy (or even seamless) accessibility of LO's network for user.

BRIEF DESCRIPTION OF THE DRAWINGS

Further details, features, objects, and advantages are apparent from the following detailed description of example embodiments of the present invention which is to be taken in conjunction with the appended drawings, wherein

FIG. 8 shows an apparatus according to an example embodiment of the invention;

FIG. 9 shows a method according to an example embodiment of the invention;

FIG. 10 shows an apparatus according to an example embodiment of the invention;

FIG. 11 shows a method according to an example embodiment of the invention;

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

If a same reference sign is used in plural figures, it denotes a same or corresponding entity.

Motivation:

The motivation for the LO to use 5G instead of other RATs such as WiFi is that 5G provides unique features such as ultra-reliability and low-latency communications, along with extreme mobile broadband data rates. This would be ideal for the LOs seeking to deploy high-performance gaming arenas, virtual reality centers, and potentially new business cases where the LOs can make use of such unique 5G features to create new business opportunities. The virtual reality centers could provide end users with access to live football games, concerts, etc., with the users using their smartphones to access such services. If the access for the end user to the LO network is made easier, this would enable users irrespective of the IO to be able to access the services provided by the LO. From industrial drivers perspective, currently Google is planning to provide network at 3.5 GHz in US using the Citizen Broadband Radio System (CBRS). In future, such networks could be provided by other industrial players such as industrial IoT, with explicit focus on various services as well.

Conventionally, users of the IO may roam into the LO network based on the user identity provided on the SIM card (e.g. USIM). The user identity on the SIM card (e.g. USIM) is an example of "user information". However, according to some embodiments of the invention, this roaming may be replaced by a use of application level details for authentication, instead of the SIM card. The application level details are an example of "credentials".

Figure 1:
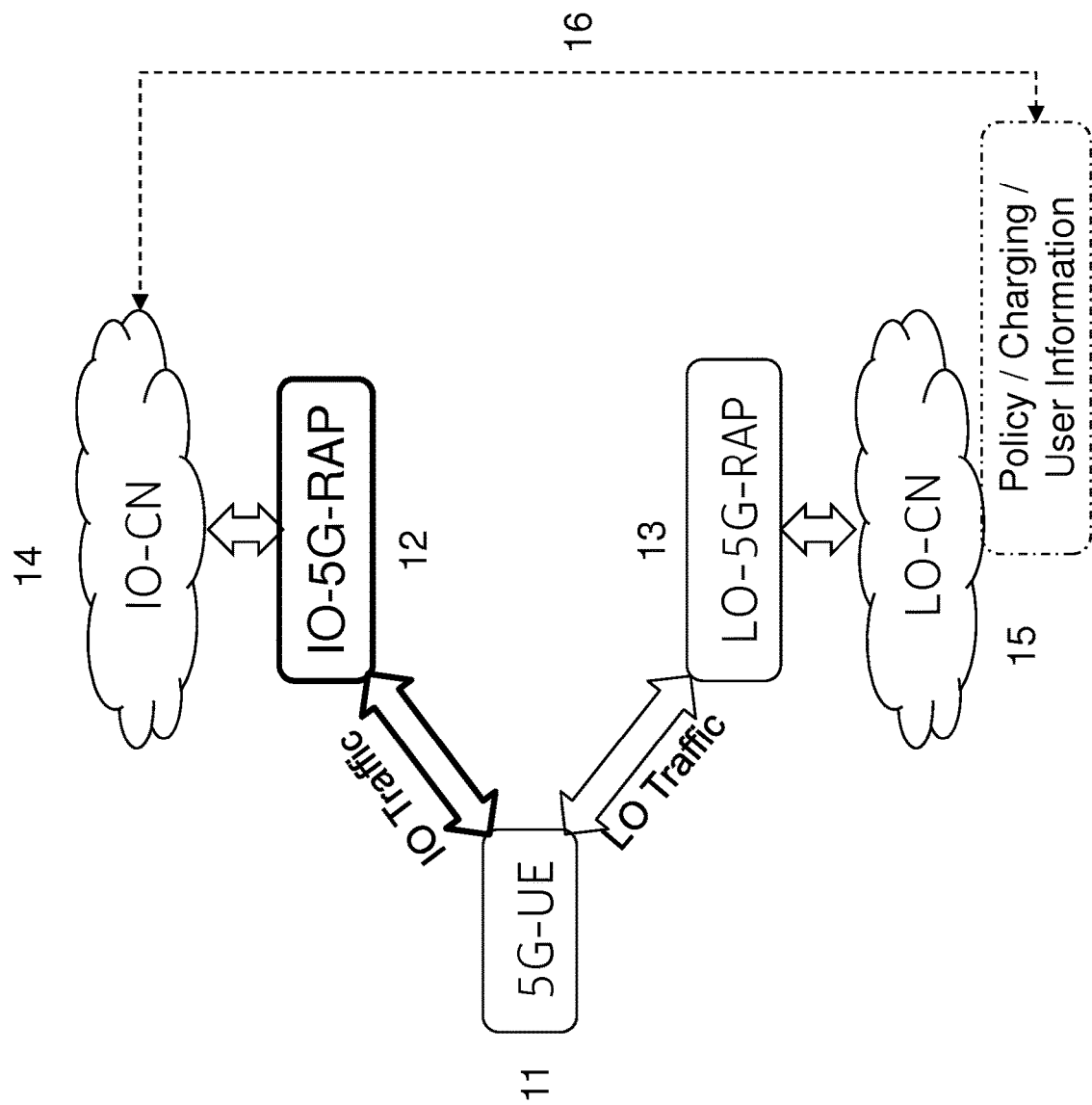
FIG. 1 shows a basic scenario according to some embodiments of the invention.

An example of a basic scenario according to some embodiments of the invention is shown in FIG. 1, where the 5G-UE 11 has multi-operator multi-connectivity with the LO and IO with both networks potentially carrying traffic from and to the UE simultaneously. That is, the 5G-UE can be connected simultaneously to both 5G-RAP 12 of the IO and 5G-RAP 13 of the LO, and traffic can be carried on both of these connections. The RAPs are connected to the respective core networks (CN) 14, 15. In one example, the IO-core network provides connectivity to basic services such as voice calls, internet, etc., and the LO-CN provides connectivity for special services and use cases. There may not be a separate SIM at the UE for the LO, but there is a logical link 16 between the policy, charging and user information functions within the LO-CN to the IO-CN, potentially over the Internet, or over some other network. This means that there may be a logical link via the application layer between the LO-CN user-specific functions and the 5G-UE application layer. Thus, new users can be created, prepaid/post-paid charging functions configured for the LO using the IO-CN as well. The 5G-UE is assumed to have multiple transmit-receive chains and related functionalities to support multi-operator multi-connectivity. UEs having a single transmit-receive chain could operate with a lower performance level as well, at least for some of the scenarios described below.

In some embodiments of the invention, one network is different from another network if the respective core networks are different from each other.

One problem to be solved is: How to provide the 5G-UE multi-operator multi-connectivity in a standardized manner, so that the LO operators can deploy their network using 5G-RAPs and provide ultra-reliability, low latency, high capacity and other key 5G features? With the new localized spectrum licensing/sublicensing agreements, the LOs can have access to large amounts of spectrum due to local usage only, without depending on the IOs.

In an obvious solution the LO would cooperate with IOs in order to provide support for system access and charging functionalities. However, this would limit the flexibility from the LO perspective in fast (and possibly random) deployment of networks and new models for revenue creation. Having a solution that can work with standardized procedures would enable reduced deployment costs as compared to proprietary solutions. Currently there are no solutions which provide easy LO deployment where the focus of the network deployment is on tailored service provisioning. Especially with a SIM-less access to LO network, there needs to be a solution for issues such as cell selection, authentication, etc.

According to some embodiments of the invention, operators are enabled to deploy networks in unlicensed band which can tightly interwork with the LTE network, based on an application layer method.

According to some embodiments of the invention, it is provided a method enabling multi-operator multi-connectivity operation, with normal cell selection and related procedures for the IOs and to use application specific criteria for the LOs. For example, the UE application layer provides assistance/trigger in one or more of the following operations:

Cell Search: The application layer initiates and provides the frequency bands and centre frequencies for searching at the appropriate conditions.

Cell Selection: The cell selection criteria, with appropriate IDs for example PLMN IDs or other application related IDs, Random Access Channel preambles, etc., would be provided by the application layer, based on the dynamic information available from the application server, which may be in the cloud.

Traffic Steering between IO and LO: The application layer provides an indication to the UE buffers about routing certain traffic types over the LO network and the IO network, respectively.

Charging: Based on the application layer user information and authentication information provided during cell selection and connection establishment, the charging of the usage of the LO network is done by the LO on the application that is providing the service.

Figure 2:
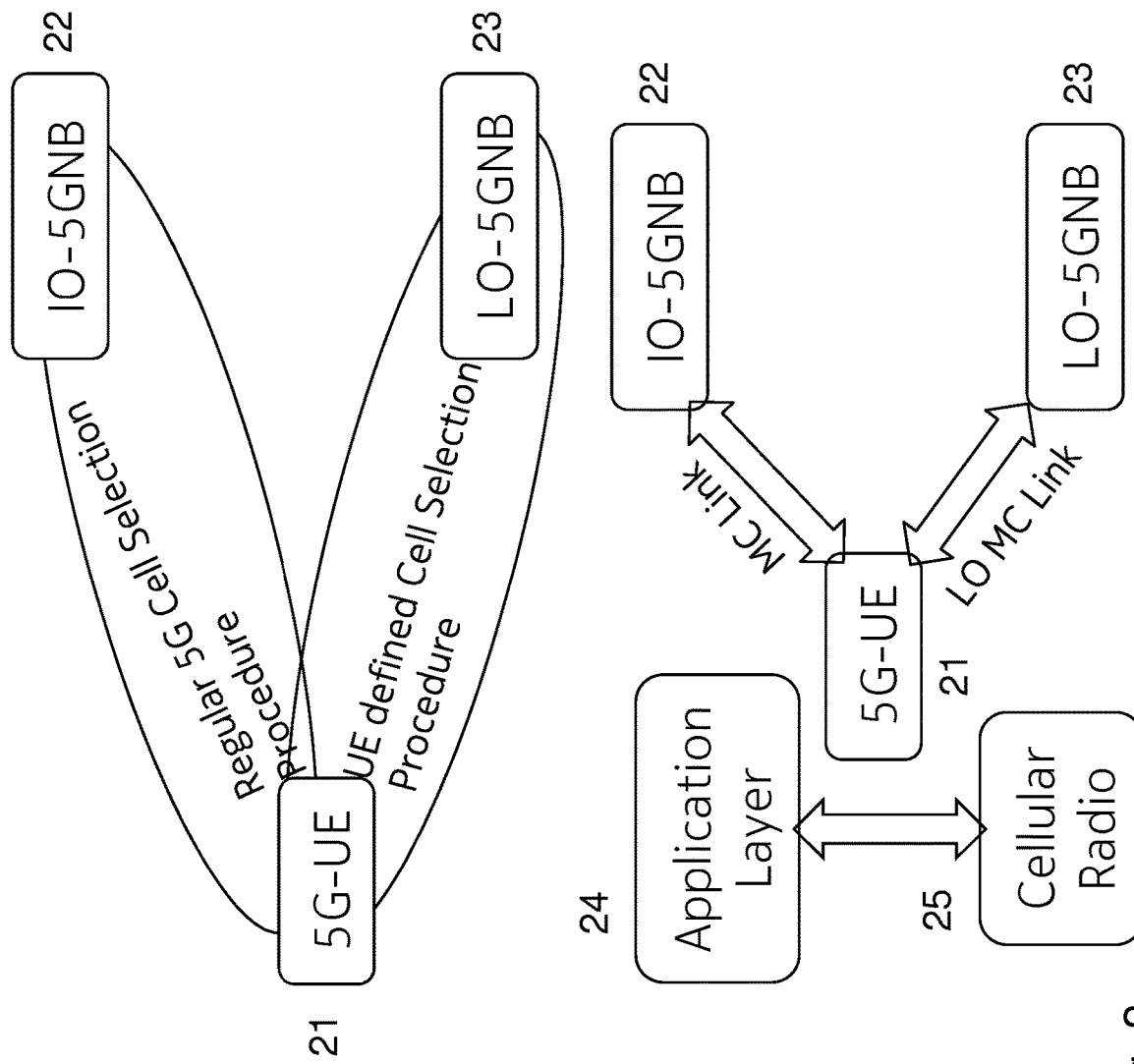
FIG. 2 shows an overview of the multi-operator multi-connectivity concept according to some embodiments of the invention.

FIG. 2 gives an overview of the multi-operator multi-connectivity concept on which some embodiments of the invention are based. As shown in the bottom part of FIG. 2, a 5G-UE 21 is connected to 5GNBs of the IO (IO-5GNB 22) and the LO (LO-5GNB 23), respectively, via multi-connectivity links. The 5G-UE itself has a layered software structure comprising an application layer 24 and a cellular radio layer 25. Each of these layers may comprise one or more sub-layers. For example, the cellular radio layer 25 may comprise a physical layer, a radio resource control layer, and a radio link control layer. The application layer 24 typically comprises client parts of one or more applications.

Figure 17:
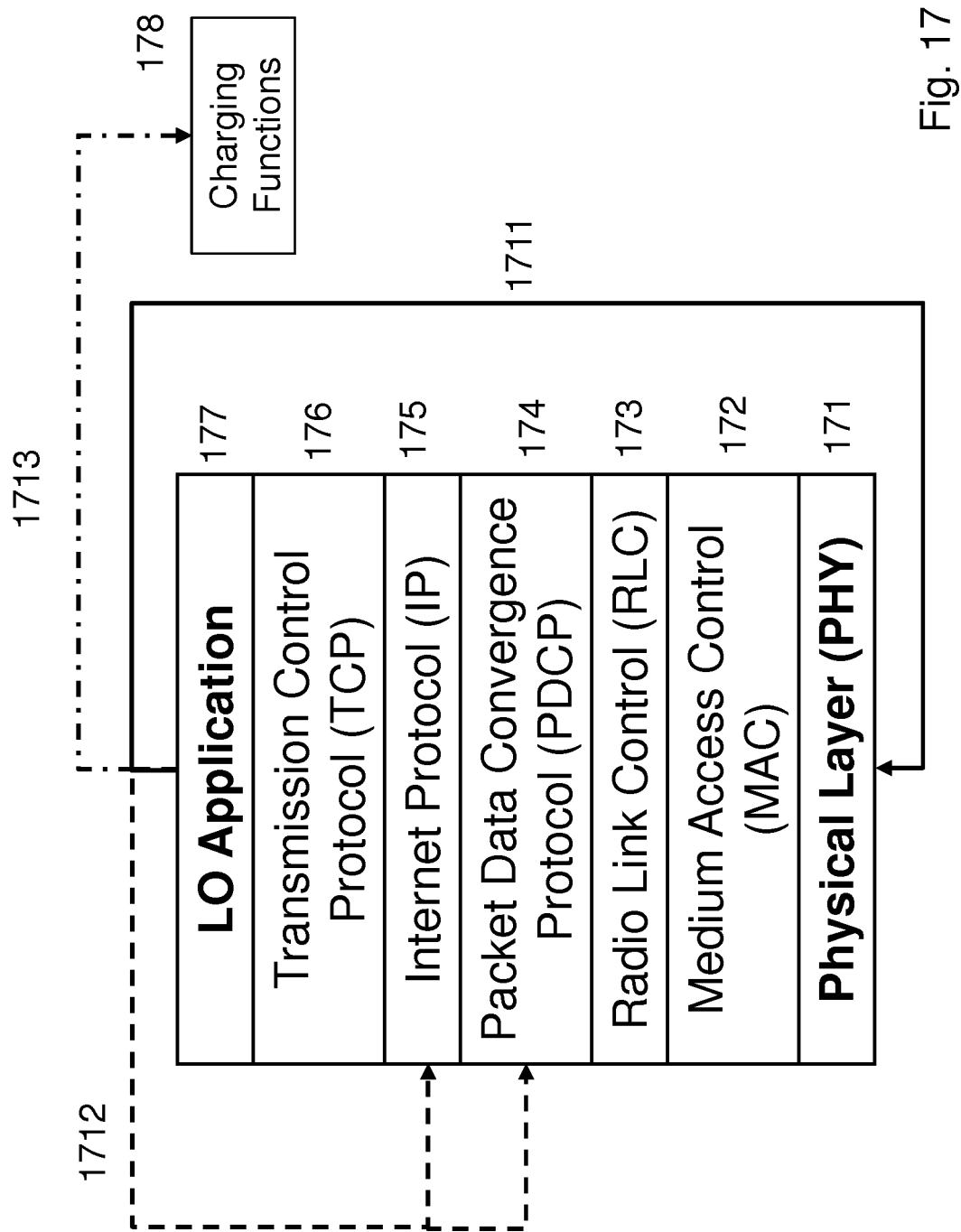
FIG. 17 shows a protocol stack with interfaces according to some embodiments of the invention.

A protocol architecture according to some embodiments of the invention is shown in FIG. 17. Here the LO Application 177 provides the cell search and selection parameters (including the initiation of the process) to the physical layer 171 of the UE protocol stack, for example, using a new interface 1711, which could for e.g., be implementation specific or through newly defined open Application Programming Interface (API). For traffic steering, the LO Application 177 could route either the IP layer 175 packets meant for the LO network, to the appropriate radio interfaces or providing the rules to the PDCP layer 174 of the protocol stack (interface 1712). Newly defined interface 1713 may be used towards the charging function 178, in order to enable the charging of the user for services used in the LO network and/or the usage of the LO network for the services. Medium Access Control (MAC) 172, Radio Link Control (RLC) 173, and Transmission Control Protocol (TCP) 176 layers are conventionally known and may not be affected by some embodiments of the invention. FIG. 17 is given as one example for IP packet, similarly the described method can be extended to other use cases as well for example Ethernet packet.

In the top part of FIG. 2, an example embodiment of the invention is shown according to which the 5G-UE 21 selects the IO-5GNB 22 based on conventional (regular) 3GPP procedures. On the other hand, the LO-5GNB 23 is selected by a selection procedure in which the UE (e.g. the application layer thereof) is involved. This selection procedure is named as "UE defined cell selection procedure" and is explained at greater detail further below.

Figure 3:
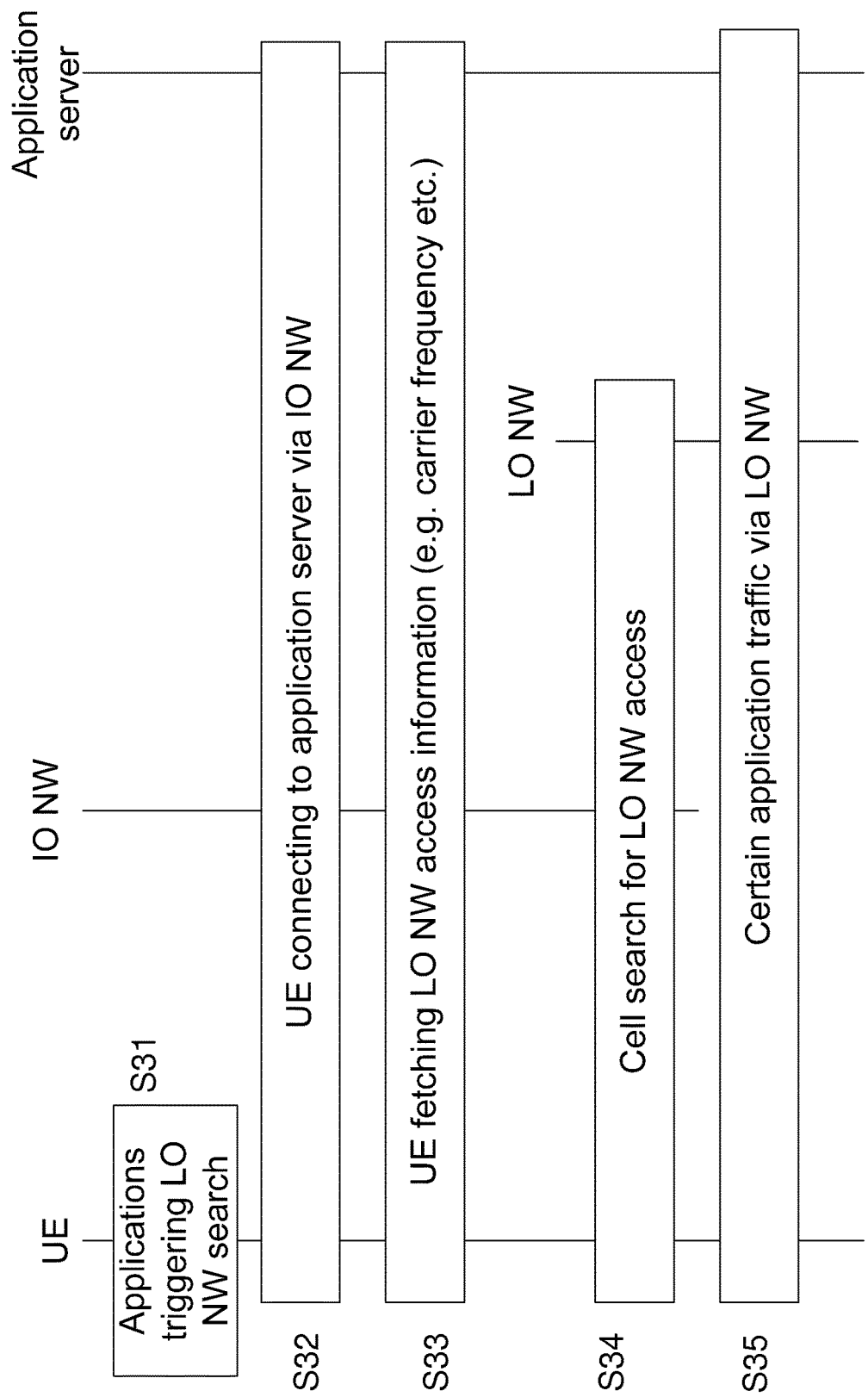
FIG. 3 shows a signaling diagram for cell detection, selection, and access according to some embodiments of the invention.

FIG. 3 shows a message flow according to some example embodiments of the invention. In the UE, an application such as Google Playstore (client part of the application) is running (S31), wherein the application may trigger a search for a LO network. Since the UE is served by the IO network (conventional 3GPP process), the UE connects to the server part of the application running on an application server via IO network (S32). The application server provides to the UE access information (such as carrier frequency) (S33). The application server may provide this information either on its own volition or because of a request from the client part of the application. Then, UE (e.g. the cellular radio layer) searches for the LO NW access (S34), based on the access information received from the application server. For example, the application layer may provide the received access information to the cellular radio layer, or the application layer may generate some control commands in order to control the cellular radio layer based on the received access information. In some cases, the application server can trigger LO NW cell search as well for example in case that the application server is aware of the geographical coverage information of LO NW and the location information of 5G UE. If LO NW grants access to the UE, the UE may steer some traffic (in particular traffic related to the application mentioned with respect to S31) via LO NW to the application server (S35). That is, the UE can be connected to both IO network and LO network simultaneously.

In some cases, e.g. if other services than the above mentioned application are not requested by the UE, the UE may disconnect from the IO network.

Figure 4:
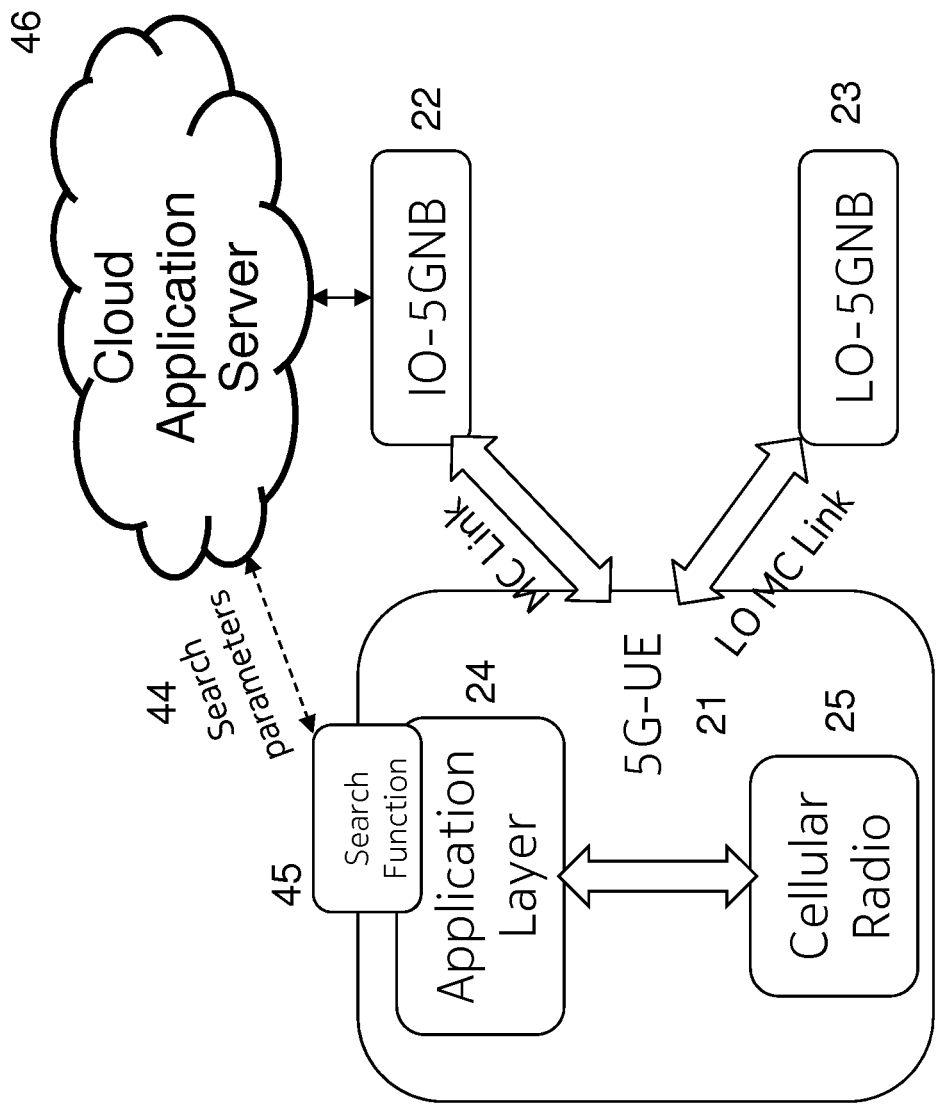
FIG. 4 shows a cell search procedure according to some embodiments of the invention.

Some of these steps according to some embodiments of the invention are explained at greater detail further below.
Cell Search:

As shown in FIG. 4, according to some embodiments of the invention, the UE application layer 24 (client part) interacts with the application server 46 (server part) to provide the access parameters to the cellular radio layer 25 of the UE 21, for example parameters 44 needed for cell search according to a search function 45. Here, the parameters may include e.g. one or more of the frequency bands and/or center frequencies to listen for the discovery/synchronization signals and when/where to initiate cell search. This enables a dynamic provisioning of information to the UE, where the frequency bands and other related radio parameters may be configurable.

The application server could also provide radio fingerprint information to help optimizing the cell search procedure by searching only when required, thereby saving UE battery power. For the radio fingerprint information, the application server could do crowdsourcing (collecting information from all the UEs subscribing to a particular application for accessing LO networks), based on the cell search information provided by all the UEs subscribed to that application.

Here the application could be an aggregation point where multiple local operators collaborate to provision service to the end users. One example could be to use the popular social media sites such as Facebook or Google to provide authentication and cell search information, where multiple LOs can collaborate and reuse the available information. Thus, a generic application such as an application store from the UE's OS provider could provide the access to the charging and authentication functions it inherently has, to enable the LOs provide their connectivity solutions. The application (e.g., the Google Playstore) may provide the charging and authentication function for the LO network, if it already has the credentials of the user and credit card information.

Figure 5:
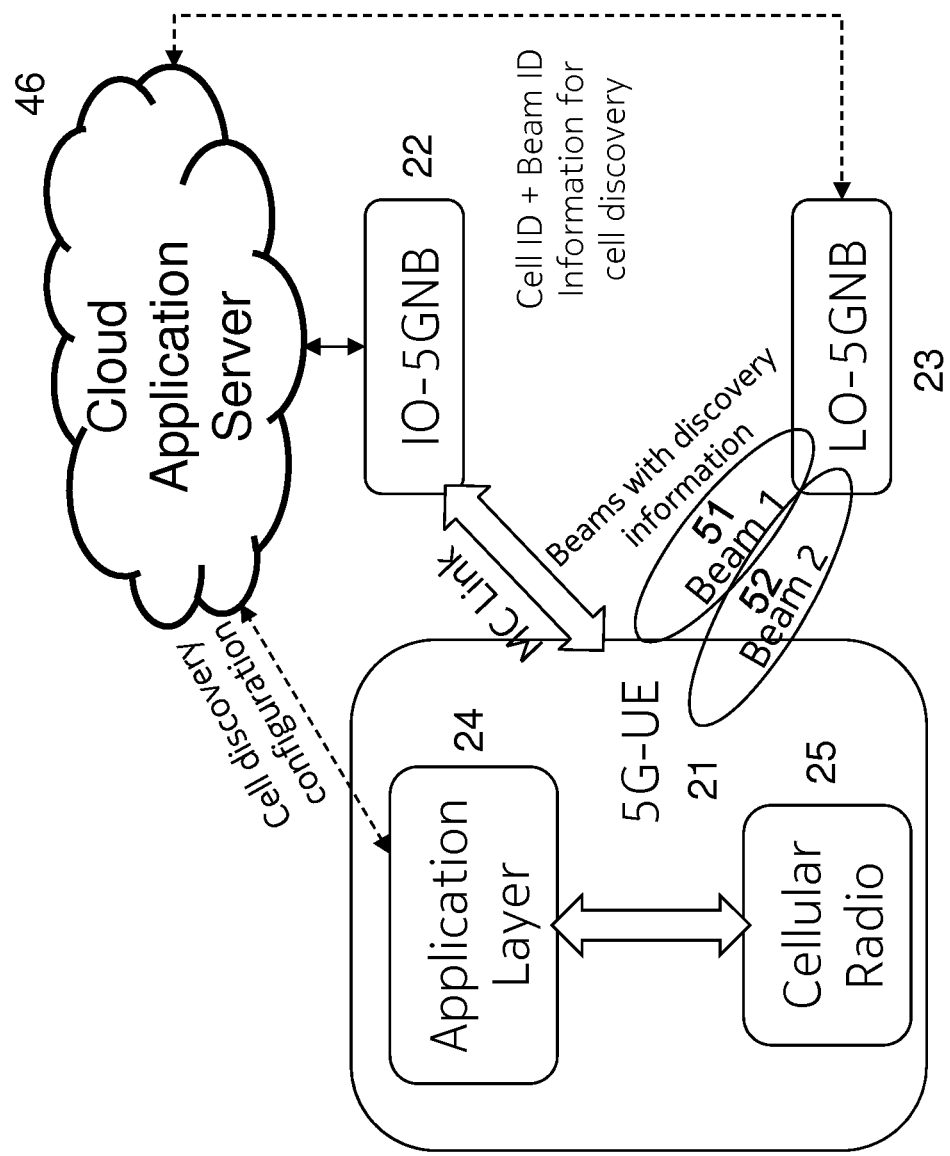
FIG. 5 shows a cell search procedure with beam discovery according to some embodiments of the invention.

In 5G, the cell search and discovery may be based on beam-specific system design. Some embodiments of the invention provide a discovery signal and/or system information broadcast over specific beams in the LO network which is application context aware, based on the LO-App (server part) determining the UE proximity to the LO network and possible location information. In 5G, the 5GNB 23 may not send the system access and discovery signal information all the time, due to the optimization of always-on signals for energy savings and due to the avoidance of unnecessary information broadcasting, in order to optimize for spectral efficiency and capacity. According to some embodiments of the invention, the LO-App configures the appropriate beams 51, 52 (based on beam IDs) in the LO-5GNB 23 to send discovery and synchronization information, along with the system information, so that the 5G-UE 21 can discover the LO-network, and provides the same information to the client part of the application 24 on the UE 21, which informs the cellular radio layer 25. An overview of this procedure is shown in FIG. 5, where the LO-App (server part on (cloud) application server 46) sends the LO-5GNB discovery information, which informs the 5GNB 21 to configure discovery and system information broadcast through Beam-1 51 and Beam-2 52. Note that the application server may be a separate application server or may be installed on the cloud (cloud application server).

Cell Selection:

In some embodiments of the invention, the application layer provides the cell selection parameters such as the PLMN selection criteria, and the application layer may also provide radio parameter information (such as signal strength and quality criteria). The LO cellular radio layer uses this information and compares it with the information available in for example SIB1 cellAccessRelatedInfo parameter to decide whether or not to select the detected cell. The information related to the random access procedure, especially using application layer random access preambles could also be provided. In some embodiments, the application layer may provide the cellular radio layer with the possible random access preambles that needs to be used for cell initial access.

Traffic Steering Between IO and LO:

Due to the use of multi-operator multi-connectivity, efficient traffic steering mechanisms are required to steer traffic between the LO and IO. Here, a typical assumption is that the traffic meant for IO may be prioritized and routed to the IO using legacy traffic flow templates (TFT). For the LO, according to some embodiments of the invention, the traffic flow templates are provided by the application server directly to the client part of the application on the UE, which then influences the UE application scheduler which decides which network the traffic should be routed to, to route traffic according to the available rules. Such traffic steering mechanisms can be particularly useful, since the LO network could be tailored for provisioning very specialized services such as high-performance gaming or virtual reality arenas which imposes strict limitations on the throughput and latency requirements of the traffic, for example. A traffic flow template is an example of a traffic flow parameter.

The LO network may also use concepts like mobile edge computing, whereby the core network is collocated with the radio access network, to minimize the end-to-end latency for the services provided over the LO network. Since the IO can be deployed for all the services possible, such tailored service provisioning may not be possible or desired in the IO network. The LO providing access to a limited set of services can provide the UE with the application ID parameters in order to enable the traffic steering.

Figure 6:
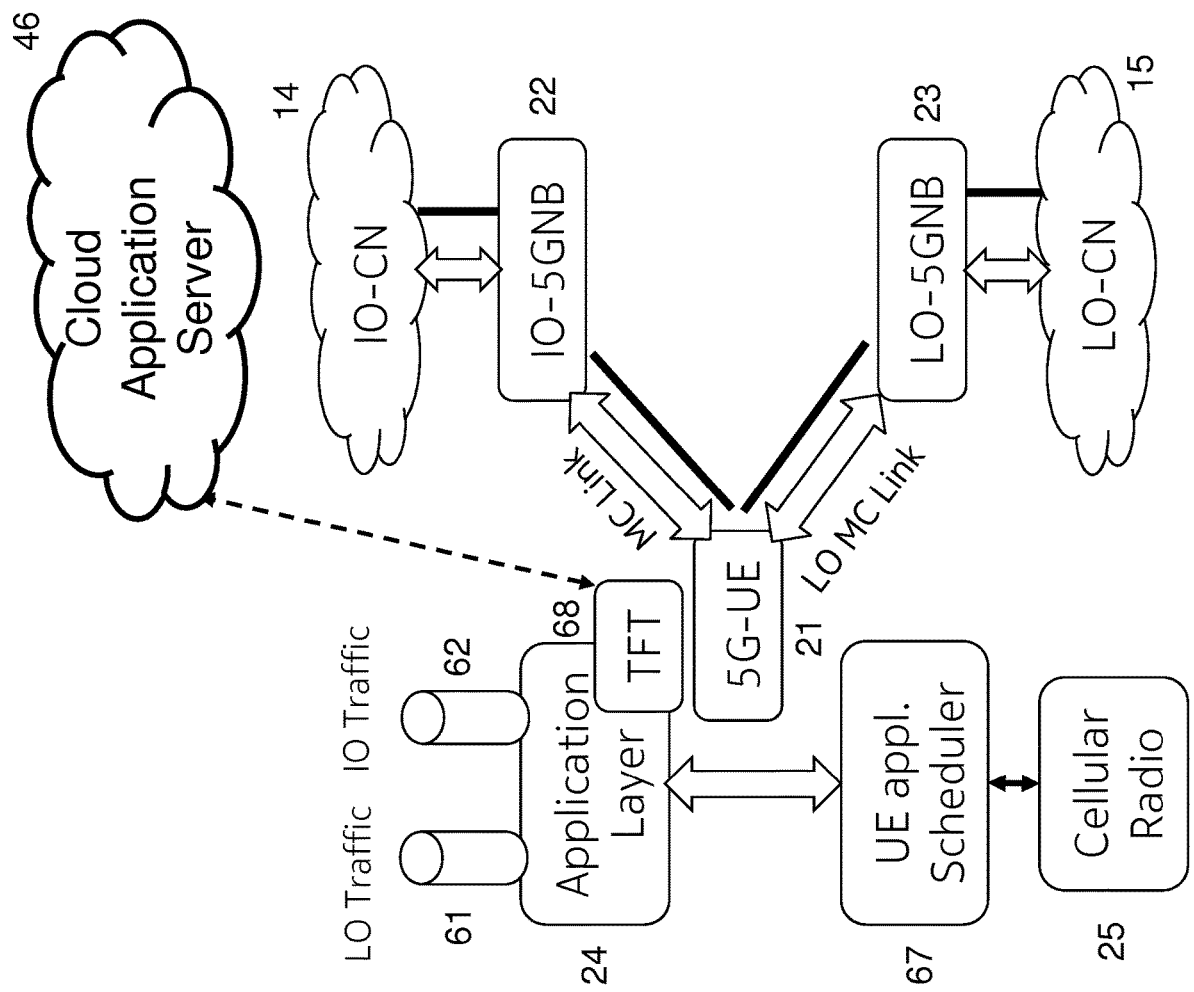
FIG. 6 shows a traffic steering procedure according to some embodiments of the invention.

Some of the steps involved in a method according to some embodiments of the invention are shown in FIG. 6. Namely, the application server 46 (e.g. cloud application server) provides the TFT 68 to the client part in the application layer 24 of the UE 21. Based on the TFT, the UE application scheduler 67 controls the cellular radio layer 25 to route certain traffic (LO traffic) to the LO-5GNB 23, and certain traffic (IO traffic) to the IO-5GNB 22, which forward this traffic to the respective CN 14, 15. 61 and 62 designate the respective traffic buffers.

Charging:

Here the charging function can be based on the UE application subscription information that is provided during the service flow establishment. This may simplify the LO network architecture by removing the concept of roaming based on information on the SIM card, as discussed hereinabove, although roaming is not excluded. It may enable use cases where end users from anywhere of the globe subscribing to a particular service can access the LO network. Here the charging policies may depend on the traffic volume, service type, etc., used by the end user. The LO Packet Data Network-Gateway (P-GW) could enforce the bearer level QoS class identifier values (QCI) based on the UE application (UE App) subscription type. The LO-RAN may enforce these QCI values, similar to the mechanisms used in LTE evolved packet core (EPC).

Since the application layer knows the user identity (e.g. MSISDN) from the time when the user (client part) accessed the application (server part) via the IO network, it may still apply the same charging mechanism (e.g. prepaid/postpaid) even if the client part access the server part via the LO network. Furthermore, the application may charge the user for usage of the LO network by the same charging mechanisms.

Figure 7:
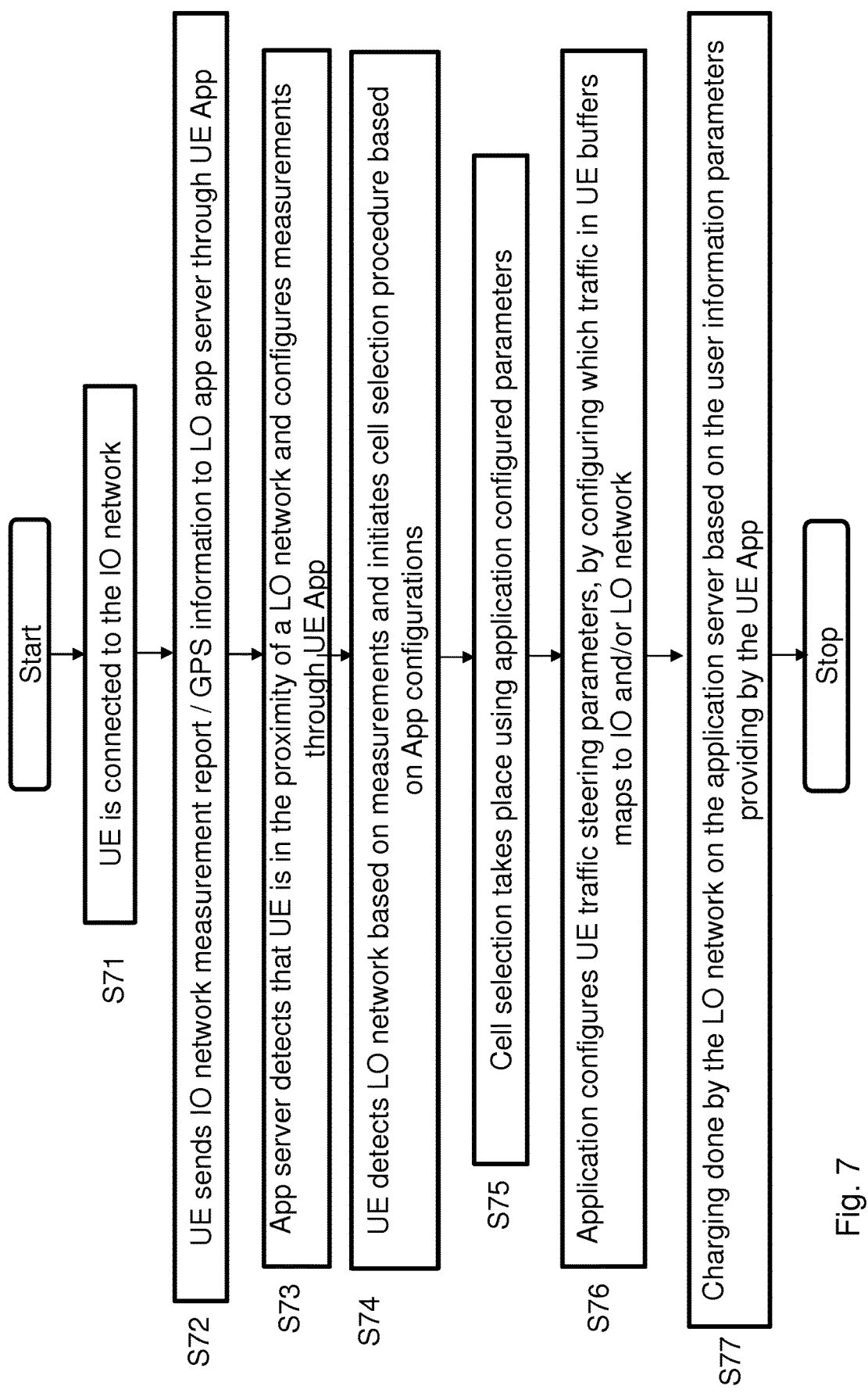
FIG. 7 shows a flow diagram according to a method of some embodiments of the invention.

FIG. 7 shows a further message flow according to an example embodiment of the invention. In the beginning, the UE is connected to the IO network (conventionally) (S71). Then, the UE sends a measurement report of the IO network and/or GPS information to the application server via the client part of the application on the UE (S72) using the IO network. Instead of or in addition to GPS information, data of another positioning system (e.g. Galileo) or other location information may be transmitted.

Based on the provided measurement report and/or location information, the application detects that the UE is in the proximity of the LO network. For example, the LO application server may have the radio fingerprint information in the vicinity of the areas where the LO 5GNBs are deployed. The radio fingerprint information comprises information about the IO network in the vicinity of the LO network. The IO network measurements that the UE conducts as part of its normal operation, especially for enabling mobility and service continuity, may comprise corresponding information. For example, the radio fingerprint information may contain the IO network cell IDs and corresponding signal strengths, which are normally measured by the UE. Thus, the UE conducts IO network measurements and conveys this information to the client side of the LO application in the UE, which passes on this information to the application server, via the IO network. The application server, based on matching the radio fingerprint information with IO measurements performed by the UE, estimates the proximity of the UE to the LO network. If the server estimates that the UE is indeed in the proximity of LO network, it configures the LO App in the UE to configure the UE radio layer to initiate cell search and selection procedure. Accordingly, the application configures the UE (the cellular radio layer thereof) to perform measurements to detect the LO network (S73).

If the UE detects the LO network based on the measurements, it initiates a cell selection procedure (S74). The cell selection procedure may be based on parameters provided by the application, as outlined hereinabove (S75).

If the UE has accessed the LO network and is still served by the IO network, traffic steering may be performed in order to route the traffic to the appropriate network (S76). The traffic steering may be based on parameters (such as a traffic flow template (TFT), which is a template provided (e.g. by the core network) to the UE informing about the relative priorities of the applications requesting resources for uplink transmissions. This information may be enhanced to inform the UE as to which traffic should be routed to the LO or IO network, respectively) provided to the cellular radio layer by the application.

Charging of the traffic in the LO network may be done on the application server, based on the information (e.g. credentials) provided by the UE. The information may include any information that the charging functions require to charge the user, via the client part of the application.

FIG. 8 shows an apparatus according to an example embodiment of the invention. The apparatus may be a terminal such as a UE, or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises monitoring means 110 and controlling means 120. The monitoring means 110 and controlling means 120 may be a monitoring circuitry and controlling circuitry, respectively.

The monitoring means 110 monitors if a network information from a server part of an application is received by a client part of the application (S110). The network parameter is related to a second network (e.g. LO network). The client part, which is typically installed on a terminal (UE), is connected to the server part via a first network (e.g. IO network). The first network and the second network are different from each other but of a same radio access technology such as 5G, LTE, or LTE-A.

If the network information is received (S110="Yes"), the controlling means 120 controls a cellular radio layer (e.g. of the UE on which the client part is installed) such that it interworks with the second network based on the network information (S120).

FIG. 10 shows an apparatus according to an example embodiment of the invention. The apparatus may be an application (or application server), or an element thereof such as a server part of the application. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises providing means 210. The providing means 210 may be a providing circuitry.

The providing means 210 provides, by a server part of an application, a network information to a client part of the application (S210). The network information is related to a predetermined second network (e.g. LO network). The client part is connected to the server part via a first network (e.g. IO network), the first network and the second network are different from each other but both of a same radio access technology such as 5G, LTE, or LTE-A.

Figure 13:
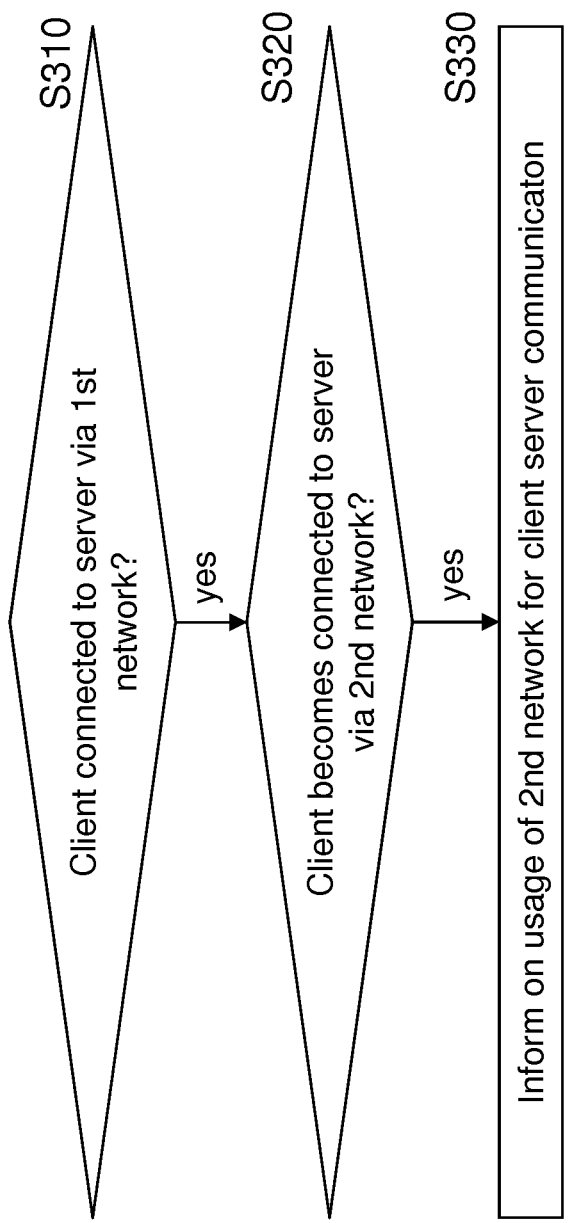
FIG. 13 shows a method according to an example embodiment of the invention.
Figure 12:
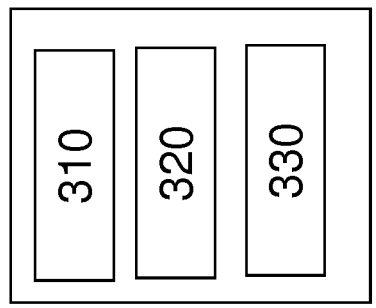
FIG. 12 shows an apparatus according to an example embodiment of the invention.

FIG. 12 shows an apparatus according to an example embodiment of the invention. The apparatus may be an application (or application server), or an element thereof such as a server part of the application. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus according to FIG. 12 comprises checking means 310, monitoring means 320, and providing means 330. The checking means 310, monitoring means 320, and providing means 330 may be a checking circuitry, monitoring circuitry, and providing circuitry, respectively. The apparatus of FIG. 12 may comprise the features of the apparatus of FIG. 10, too.

The checking means 310 checks if a client part of an application is connected to a server part of the application via a first network (e.g. IO network) of a radio access technology such as 5G, LTE, or LTE-A (S310).

If the client part is connected to the server part via the first network (S310="yes"), the monitoring means 320 monitors if the client part becomes connected to the server part via a predetermined second network (e.g. LO network) different from the first network but of the same radio access technology (S320).

If the client part becomes connected to the second network (S320="yes"), the providing means 330 provides to a charging device an information on a usage of the second network for the communication between the server part and the client part (S330). The providing means 330 may be a portion of (integrated with) the server part of the application. The providing means 330 keeps informing on the usage of the second network while the client part is connected to the server part via the second network.

Figure 15:
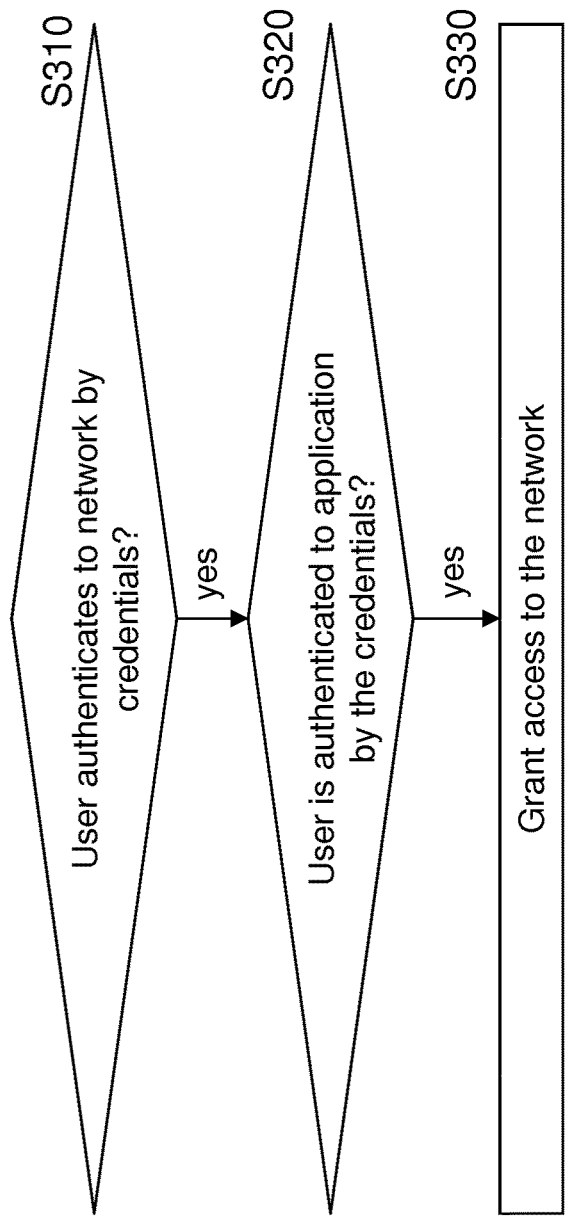
FIG. 15 shows a method according to an example embodiment of the invention.
Figure 14:
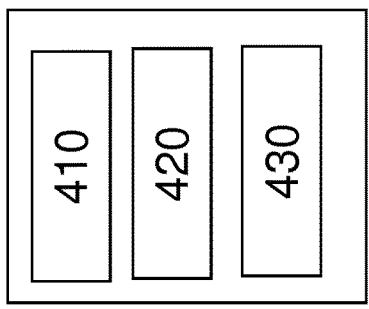
FIG. 14 shows an apparatus according to an example embodiment of the invention.

FIG. 14 shows an apparatus according to an example embodiment of the invention. The apparatus may be a radio network, or an element thereof such as a base station (NodeB, e.g. 5GNB). FIG. 15 shows a method according to an example embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus according to FIG. 14 comprises monitoring means 410, checking means 420, and granting means 430. The monitoring means 410, checking means 420, and granting means 430 may be a monitoring circuitry, checking circuitry, and granting circuitry, respectively.

The monitoring means 410 monitors if a user authenticates to a radio network by credentials in order to access the radio network (S410). For example, the credentials may be used to authenticate to an application.

If the user authenticates to the radio network by the credentials (S410=yes), the checking means 420 checks if the user is authenticated to a predetermined application by the credentials (S420).

If the user is authenticated to the predetermined application by the credentials (S420="yes"), the granting means 430 grants access to the radio network for the user (S430).

Figure 16:
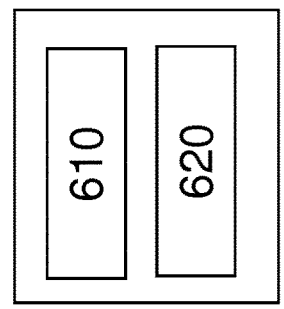
FIG. 16 shows an apparatus according to an example embodiment of the invention.

FIG. 16 shows an apparatus according to an example embodiment of the invention. The apparatus comprises at least one processor 610, at least one memory 620 including computer program code, and the at least one processor 610, with the at least one memory 620 and the computer program code, being arranged to cause the apparatus to perform at least one of the methods according to FIGS. 9, 11, 13, and 15 and related description or perform at least one of the embodiments described in this application.

Embodiments of the invention are described where the LO network is used for some dedicated (specialized) services, while the IO network is a kind of "general purpose" network. However, the services which may be offered via each of these networks are not limited in any way. For example, LO network may offer telephony, or IO network may offer real time gaming, too.

Embodiments of the invention may be employed not only in 3GPP networks (such as LTE, LTE-A, 5G) but also in other radio networks where the terminals may access plural networks simultaneously.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

A terminal may be any device which may connect to the respective network. For example, a terminal may be a UE, a mobile phone, a laptop, a smartphone, a machine-type communication device, etc.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Embodiments of the invention may be employed fully or partly in the cloud, wherein a resource (e.g. processor, software, memory, network) for the respective task may be shared with other applications.

According to the above description, it should thus be apparent that example embodiments of the present invention provide, for example a base station such as a NodeB, a eNodeB, or a 5GNB, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a terminal such as a UE, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example an application server or a server part of an application, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. An apparatus, comprising:
   at least one processor;
   at least one memory including computer program code;
   wherein the at least one processor with the at least one memory and the computer program code are configured to cause the apparatus to perform at least
   monitoring if a network information from a server part of an application is received by a client part of the application, wherein the client part is connected to the server part via a first network, the first network is of a radio access technology, the network parameter is related to a second network, the second network is of the radio access technology, and the second network is different from the first network; and
   controlling a cellular radio layer such that it interworks with the second network based on the network information if the network information is received, wherein
   the network information comprises a request to connect the client part to the server part via the second network; and
   the controlling comprises controlling the cellular radio layer to access the second network if the network information comprises the request, wherein the at least one processor, with the at least one memory, is further configured to perform
   connecting the client part to the server part via the second network after the second network has been accessed, and
   wherein a user of the client part is authenticated to the application by credentials, the user is authenticated to the first network by user information different from the credentials, and the at least one processor, with the at least one memory, is further configured to perform
   authenticating the user to the second network by the credentials.

2. The apparatus according to claim 1, wherein
   the network information comprises an access parameter of the second network; and
   the controlling comprises controlling the cellular radio layer to access the second network using the access parameter.

3. The apparatus according to claim 1, wherein the user is authenticated to the second network without using the user information.

4. The apparatus according to claim 1, wherein the user information is stored on an identity module and the credentials are not stored on the identity module.

5. An apparatus, comprising:
   at least one processor;
   at least one memory including computer program code;
   wherein the at least one processor with the at least one memory and the computer program code are configured to cause the apparatus to perform at least
   providing, by a server part of an application, a network information to a client part of the application, wherein the client part is connected to the server part via a first network, the first network is of a radio access technology, and the network information is related to a predetermined second network, the second network is of the radio access technology, and the second network is different from the first network, wherein
   the network information comprises at least one of an access parameter of the second network and a request to connect the client part to the server part via the second network, and wherein
   the network information comprises the request, and the at least one processor, with the at least one memory, is further configured to perform
   evaluating, based on at least one of a received location information and a received measurement information, if a device on which the client part is running is close to the second network; and
   inhibiting the providing of the request if the device is not close to the second network.

6. A method, comprising:
   monitoring if a network information from a server part of an application is received by a client part of the application, wherein the client part is connected to the server part via a first network, the first network is of a radio access technology, the network parameter is related to a second network, and the second network is of the radio access technology, and the second network is different from the first network; and controlling a cellular radio layer such that it interworks with the second network based on the network information if the network information is received wherein the network information comprises a request to connect the client part to the server part via the second network; and the controlling comprises controlling the cellular radio layer to access the second network if the network information comprises the request, wherein the method further comprises:

connecting the client part to the server part via the second network after the second network has been accessed, and wherein a user of the client part is authenticated to the application by credentials, the user is authenticated to the first network by user information different from the credentials, and the method further comprises:

authenticating the user to the second network by the credentials.

7. The method according to claim 6, wherein the network information comprises an access parameter of the second network; and the controlling comprises controlling the cellular radio layer to access the second network using the access parameter.

8. The method according to claim 6, wherein the user is authenticated to the second network without using the user information.

9. The method according to claim 6, wherein the user information is stored on an identity module and the credentials are not stored on the identity module.

10. A computer program product embodied on a non-transitory computer-readable medium, said product comprising a set of instructions which, when executed on an apparatus, is configured to cause the apparatus to carry out the method according to claim 6.

11. A method, comprising:

providing, by a server part of an application, a network information to a client part of the application, wherein the client part is connected to the server part via a first network, the first network is of a radio access technology, and the network information is related to a predetermined second network, the second network is of the radio access technology, and the second network is different from the first network, wherein the network information comprises at least one of an access parameter of the second network and a request to connect the client part to the server part via the second network, and wherein the network information comprises the request, and the method further comprises:

evaluating, based on at least one of a received location information and a received measurement information, if a device on which the client part is running is close to the second network; and inhibiting the providing of the request if the device is not close to the second network.

12. The method according to claim 11, wherein the network information comprises at least one of a discovery information and a synchronization information, and the method further comprises:

informing a base station of the second network on to start transmitting the at least one of the discovery information and the synchronization information.

* * * * *